United States Patent Office 3,666,491
Patented May 30, 1972

3,666,491
INSTANT SOUP PRODUCT AND METHOD OF PREPARATION
Ali R. Touba, Minneapolis, Minn., assignor to General Mills, Inc.
No Drawing. Filed Feb. 9, 1970, Ser. No. 9,941
Int. Cl. A23l 1/40
U.S. Cl. 99—124       14 Claims

ABSTRACT OF THE DISCLOSURE

The crouton has an adhering layer of a dry soup base and is suitable for the instant preparation of soup by the addition of the croutons to hot water. The dry soup base layer may be applied to the crouton, for example, by coating the crouton with a bonding agent and then contacting the crouton with powdered dry soup base. The soup base layer may alternatively be applied by other methods such as co-extrusion of the crouton and soup base.

---

The present invention relates to an instant food product and more particularly to a dry soup product which may be instantly converted to ready-to-eat soup, such as by the addition of water.

In recent years there has been a substantial increase in the number and variety of instantly prepared foods available to the consumer. In fact it is not often that the homemaker prepares from scratch such food items as soup. This is primarily due to the fact that preparation in the home is usually time consuming, difficult and more expensive than use of instantly prepared foods. For example, preparation of soup in the home necessitates shopping for and purchase of numerous ingredients, many of which come in inconvenient sizes for preparation of soup for a single meal. The amount of the various ingredients used must be in the correct proportions. The importance of this may not be recognized by the homemaker and even if recognized may not be easily carried out in the typical home kitchen. Furthermore, preparation of soup in the home may require cooking for several hours.

The homemaker therefore has turned to the instantly prepared soup which may come in any of several concentrated forms. For example, the soup may come in the form of dry granules, dry compacted cubes or as a concentrated liquid which, when prepared for eating, is diluted, such as with water, to the desired concentration. The available forms of prepared soup certainly are convenience foods; however, they each have inherent disadvantages.

The granular and dry cube forms, for example, beef bouillon, are highly convenient in that they are compact thus requiring very little storage space and can be used in amounts as desired. They, however, usually do not contain food material intended for eating in a solid form and therefore are not as satisfying as might be the case if they did contain such solid material. Attempts have been made in the past to provide a dry soup material which upon reconstitution would provide a soup including solid edible material. For example, Pat. No. 2,236,641 shows a soup package including dry concentrated powdered soup stock, grated cheese, dried cooked onions, and cheese croutons. This required a complex packaging arrangement. Each ingredient was separately packaged thus increasing the cost of production. Furthermore, the ingredients were not easily measurable if less than a full package of soup was to be prepared.

Although the known dry forms of soup are said to be instantly prepared, this is not completely accurate since it normally requires several minutes to dissolve the powder, granules or cubes even in hot water. This fact, as a general rule, makes the dry soup forms unsatisfactory for use in the automated cafeteria machines and when used in the home may test the patience of a busy homemaker.

The concentrated liquid form of soup is of the type normally found packaged in tin containers and typically prepared by dilution with an equal volume of water or milk and heated. The concentrated liquid form of soup may and often does include solid food particles and can be very easily diluted. However, the liquid form may require even longer to prepare than the dry form since the liquid form normally requires heating following dilution. The concentrated liquid form is not as compact as the dry forms and thus is less desirable from the standpoint of shipping and storing. Also the liquid form may not be available in the most convenient amounts and further can be stored only for a limited time once the container is opened. For example, an individual may only want a single serving of soup whereas the typical can of soup contains several servings.

The present invention in its preferred embodiment provides a dry form of soup which upon reconstitution provides soup including solid edible material; namely, nutritious and flavorful crouton pieces which remain crisp and tasty many times longer than previously known bread croutons. For example, the preferred croutons of the present invention remain crisp for at least 10 to 15 minutes in hot soup, whereas, previously known croutons become soggy in texture very quickly. The present invention provides a dry form of soup which may be reconstituted much more rapidly than the dry forms previously available. A single portion may be easily prepared and yet the remainder may be stored for an extended period of time without spoilage or loss of taste. The present invention provides a crouton which is coated with a soup base. The method of the present invention may include the steps of producing the croutons, formulating a soup base and applying a coating of the soup base to the crouton.

In its broader aspects, the present invention provides a flavored crouton which may be used for any of many different purposes. They may be eaten, as is, for a snack, placed in salads, added to casseroles or used for stuffing poultry for baking. However, in each instance, the croutons would, of course, be coated with a water soluble soup base.

The term "crouton" as used herein is defined as a piece of bread-like material made from flour and may contain other materials such as orange peel and/or flavoring. The crouton may be toasted and is usually crisp, at least at the time it is produced. In the broader aspects of the present invention any type of crouton may be used; however, in the preferred embodiment the crouton is made primarily of soy protein and wheat flour by a puffing process. The preferred crouton is specially formulated and puffed so as to remain crisp for a longer time and provide a high amount of protein.

The croutons preferably are made from a dough including soy flour mixed with a cereal or grain flour such as wheat or rye flour. However, the croutons may contain other flour or meal, for example, the high protein meals from coconut, sunflower, peanut or cottonseed. The soy flour preferably contains 65% or less soy protein. If the soy flour and the grain flour are finely ground, the croutons will have more uniform texture, appearance and eating quality. The preferred flour contains by weight 0 to 65 parts soy flour and 100 to 35 parts wheat flour based on 100 parts total flour. The mixture may further include citrus peel material, such as up to 1 part dry, finely ground citrus peel composition and about ½ part sodium chloride per 100 parts flour. The mixture may also include flavoring agents, such as cheese and soup base in amounts effective for flavoring purposes, typically, 2 parts.

The croutons used in the following examples were prepared by extrusion using 45 parts soy flour of the type known as Nutrisoy and produced by Archer Daniels Midland Co. under the designation untoasted, 55 parts wheat second clear flour, ½ part sodium chloride, ⅓ part orange peel composition[1] and between 28 and 35 parts water. "Parts" as used herein means parts by weight unless otherwise indicated. The dry ingredients were first mixed, then water was added in the extruder.

The extruder was of the type shown and described in U.S. Patent No. 3,117,006 and manufactured by Wenger Manufacturing, Inc. of Sabetha, Kans., under the designation X-25. The extruder included an arrangement for metering dry feed to the rear of a power screw series. The power screw series included a rear screw, a single section mid screw and a forward cone screw. Steam dams were provided between adjacent screws. The screws were operated at about 300 revolutions per minute. The flour mixture was passed into the extruder at the rate of about 5 pounds per minute and was mixed with water at the rear end of the power screw series thus forming a dough. The water was added at the rate of about 750 milliliters per minute. The extruder was provided with three temperature-control jackets spaced along the screws. The temperature of the water leaving the jackets was 50° F., 70° F., and 90° F., respectively, from feed end to extrusion end of the extruder. The die was a ¼ inch venturi and was operated at 220° F.

As the dough passes along the extruder, the screws apply pressure and work to the dough and, as the dough passes through the die, steam is created within the dough. Thus the pressure within the dough is substantial and the dough expands upon release from the die. If desired, other types of extruders may be used.

The dough was extruded in the form of a rope which was circular in cross section and had a diameter of ½ inch. If desired, the rope may have other cross-sectional shapes, such as square or hollow. In some instances the croutons will be hollow or donut shaped and the center will be filled with soup base. Alternatively, they may be molded into a cup-shape. This is of especial advantage in cream-type soups where larger amounts of soup base are necessary. In this instance, if desired, the crouton may be coated only on a portion of its surface, namely, the inside surface. The rope was cooled at room temperature for 30 seconds following extrusion and then cut into pieces approximately ½ inch in length. The pieces were allowed to dry for about 20 hours at room temperature. Alternatively, the pieces may be oven dried. The dried pieces, which contained about 10% water, were deep fat fried by dipping for 20 seconds in coconut oil which was at 356° F. The hot oil was found to make the croutons crunchy and increase the length of time the croutons can remain in hot soup without becoming soggy. For example, the croutons can remain in the hot soup for up to 15 minutes and yet remain crunchy. The coconut oil had a congealing point of 92° F. The pieces were then oven toasted for about 12½ minutes at about 350° F. Toasting the croutons gives them an even brown color. The pieces are cooled at room temperature for between 3 and 4 hours and then coated. Alternatively, the croutons may be coated immediately following toasting.

The coating or enrobing process is preferably carried out by applying a layer of a bonding agent, such as melted hydrogenated coconut oil, to the croutons and then dusting the croutons with the soup powder. As used herein "bonding agent" means an edible substance such as water, oils or gums that will bond the soup base to the crouton. If desired, one or more additional layers of soup base may be applied simply by applying additional bonding agent and again dusting the croutons. The various layers may vary in composition. For example, the first layer may be an instant beef soup base and the next layer an instant onion soup base. Alternatively, one of the layers may be other than a soup base; for example, a crouton may be provided having a first layer of cheese and a second layer of instant onion soup base. Moreover, the soup base layer may contain material which will disperse in the liquid upon reconstitution yet remain in a solid form for eating, typically dehydrated onion.

The bonding agent is preferably an edible oil having a congealing temperature above normal room temperature and preferably about 90° F. Conceivably, the oil may have a congealing temperature below room temperature; however, this would probably necessitate refrigeration of the coated croutons during shipping and storage. The oil should have a congealing temperature low enough to liquify in hot soup and remain liquid during eating of the soup, for example, below 120° F. A higher congealing temperature would result in a waxy mouthfeel during eating of the soup. The edible oil bonding agents include hydrogenated coconut oil, hydrogenated cottonseed oil and hydrogenated peanut oil. Other bonding agents would include edible gums such as gum arabic, guar gum and gelatin. Further bonding agents would include sodium caseinate and water. A preferred bonding agent is hydrogenated coconut oil which not only bonds the soup base to the crouton, but also improves flavor. If desired, further flavoring can be included; for example, by addition of an oil soluble flavoring to the hydrogenated coconut oil. Coloring matter may also be added to the oil thereby providing a colored crouton.

Any suitable method may be used in applying the bonding agent to the croutons. In one preferred method the oil is sprayed onto the crouton. Alternatively, the oil may be applied by dipping the croutons in an oil bath and then quickly removing them. The oil is melted when it is applied to the crouton and maintained in a melted condition during application of the powdered soup. This may be done by heating the oil during spraying and by blowing hot air over the croutons during application of the powdered soup.

The powdered soup base may be of any suitable type; for example, a conventional recipe for instant soup may be used, typically, beef, chicken, pea, onion or tomato soup. The soup base, of course, should be soluble in water and water based liquids, such as milk. The soup base will generally include hydrolyzed vegetable protein, starch, flavoring, such as dried beef extract, and various spices, as well as salt and monosodium glutamate.

The powdered soup may be applied by any suitable method. One method that has been found highly satisfactory is to place the oil coated croutons in a substantially horizontally disposed drum containing some powdered soup and then rotating the drum. As the croutons are tumbled, they become coated with the powdered soup.

Any of various other methods for coating the croutons may be used; for example, the croutons may be supported on a surface which would vibrate thereby causing the croutons to tumble. Hot air blasts, alternatively carrying oil particles and powdered dry soup particles may contact the tumbling croutons. Alternatively, the croutons may be placed in a vacuum, then surrounded by soup base particles and the vacuum released. The vacuum within the crouton would pull soup base particles into the voids in the crouton. A still further method would be to coextrude a soap base paste around the crouton.

The amount of soup coating on the croutons may be controlled so as to provide soup of proper concentration by using a certain number of coated croutons per amount of liquid. The number of croutons desirably used per cup of soup will vary depending upon the shape and size of the croutons; however, it will generally be between 10

---

[1] The orange peel composition contained about 12% orange peel solids, 26% glycerine, 26% dextrose, 26% soybean oil and 10% moisture. The composition was ground to a particle size of about No. 10 mesh.

and 50 croutons per cup. It has been found that about 12 croutons per cup of soup is satisfactory when the croutons are cylindrically shaped having a diameter of ½ inch and a length of ½ inch.

A satisfactory concentration of soup base to water-based liquid in the case of beef bouillon would be about one part soup base to about fifty parts liquid; whereas, in the case of pea soup it would be about one part soup base to five parts liquid. The term "water-based liquid" when used herein means any liquid, containing principally water, which may be used to reconstitute soup concentrate. When using beef bouillon or chicken bouillon, 12 croutons for making one cup of soup may carry a total of about 4 grams, dry weight, of soup base. Cream-type soups, such as pea soup, may carry a total of about 15 grams on 12 croutons. Each crouton will therefore generally have between ⅓ and 1¼ grams of soup base in the coating.

The invention is further illustrated by the following specific examples which are not intended to be limiting.

EXAMPLE I

The following illustrates the preparation of instant beef crouton soup according to the present invention. Table I shows the composition of a typical beef flavored soup base known as beef bouillon and suitable for use in the present invention.

TABLE I

| Ingredient: | Parts by weight |
|---|---|
| Hydrolyzed plant protein [1] | 14.53 |
| Hydrolyzed plant protein [2] | 19.37 |
| Autolyzed yeast extract | 3.87 |
| Beef extract dried | 0.97 |
| Caramel color | 0.58 |
| Sugar | 7.75 |
| Monosodium glutamate | 9.68 |
| Onion powder | 0.97 |
| Garlic power | 0.10 |
| Celery salt | 0.29 |
| Salt (NaCl) | 33.90 |
| Hydrogenated coconut oil | 4.85 |
| Pregelatinized tapioca starch | 3.14 |

[1] A flavoring agent similar in taste to beef extract produced by Nestle Company, Inc. of White Plains, N.Y., under the designation Type 4BE.
[2] A flavoring agent produced by Nestle Company, Inc. under the designation Type 245.

The dry ingredients were blended for about two minutes using a two-quart Hobart Mixer at speed #1. Then the 4.85 parts of hydrogenated coconut oil were added to the dry ingredients and mixed at speed #2 for ten minutes.

Sixty of the previously described croutons were enrobed with the beef flavored soup base in a batch operation. The croutons were sprayed with melted hydrogenated coconut oil and then tumbled in a substantially horizontally disposed rotating drum containing 20 grams of the powdered soup base. The drum was a one-gallon can, open at one end, and had a pair of baffle plates to assure tumbling of the croutons. The drum was rotated at 30 revolutions per minute. The temperature of the coconut oil was 130° F. during spraying and the temperature in the drum was maintained at about 130° F. during tumbling. The croutons were further intermittently sprayed four times during the tumbling. About 0.5 gram of soup base was added after each application of oil. The croutons were tumbled until they were evenly coated. The finished product included 40.0 grams of croutons and about 20.0 grams of soup base.

Soup was prepared by adding 12 of the enrobed croutons to five ounces of hot water. The coating instantly dissolved, for example, in less than ten seconds. The resulting soup had a consistency and flavor similar to beef bouillon and included crunchy croutons floating on the surface. The croutons remained crisp for about 15 minutes.

EXAMPLE II

A chicken flavored soup was prepared in a manner similar to the preparation described in Example 1, however, using the ingredients shown in Table II.

TABLE II

| Ingredient: | Parts by weight |
|---|---|
| Hydrolyzed plant protein [1] | 22.0 |
| Hydrolyzed plant protein [2] | 6.9 |
| Autolyzed yeast extract dark | 4.0 |
| Chicken meat (cooked powder) | 2.0 |
| Chicken fat | 3.0 |
| Sugar | 11.0 |
| Monosodium glutamate | 12.0 |
| Garlic powder | 0.1 |
| Salt (NaCl) | 36.8 |
| Hydrogenated coconut oil | 2.0 |
| Turmeric | 0.2 |

[1] A flavoring agent produced by Nestle Company, Inc. under the designation Type 245.
[2] A flavoring agent produced by Nestle Company, Inc. under the designation Type 3H3–4.

The ingredients were dry blended and applied to 60 of the preferred croutons in a manner identical to that described in Example I. The finished product included 40 grams of croutons and 20 grams of soup base. Twelve of the croutons were added to five ounces of hot water and the soup base rehydrated instantly, thus forming an excellent soup including crisp floating croutons.

EXAMPLE III

The following illustrates the preparation of instant pea crouton soup according to the present invention. Table III shows the formulation of the pea soup base.

TABLE III

| Ingredient: | Parts by weight |
|---|---|
| Hydrolyzed plant protein [1] | 3.0 |
| Hydrolyzed plant protein [2] | 4.0 |
| Caramel color | 0.1 |
| Sucrose, granulated | 4.0 |
| Monosodium glutamate | 5.0 |
| Onion powder | 3.0 |
| Celery seasoning | 0.7 |
| Black pepper | 0.1 |
| Turmeric | 0.1 |
| Salt (NaCl) | 7.0 |
| Hydrogenated coconut oil | 6.0 |
| Non-fat milk solids | 5.0 |
| Gum arabic | 6.0 |
| Instant pea powder [3] | 39.0 |
| Supercol U powder [4] | 1.33 |
| Pregelatinized starch [5] | 15.67 |

[1] A flavoring agent produced by Nestle Company, Inc. under the designation Type 3–FS.
[2] A flavoring agent produced by Nestle Company, Inc. under the designation Type 3H 3–4.
[3] Produced by Valley Evaporated Company under the designation T–8.
[4] Produced by General Mills, Inc.
[5] Produced by National Starch Chemical Company.

The soup base was prepared in a manner substantially identical to that described in Example I. Approximately 1050 grams of the pea soup base was applied as a coating on 1000 grams of the previously described uncoated extruded croutons. The coating or enrobing process was as described in Examples I and II except that it was carried out in a drum having a capacity of about 16 gallons. The drum, containing the soup base and croutons, was rotated at about 14 revolutions per minute for about ten minutes. The enrobed croutons were removed from the drum and cooled. Soup was prepared by adding 27.0 grams of the enrobed croutons to five ounces of hot water and stirring.

EXAMPLE IV

The following illustrates another preferred method of preparing instant chicken crouton soup. Approximately 860 grams of the previously described croutons were enrobed with about 430 grams of the chicken soup base described in Example II using water as the bonding agent. The enrobing process was carried out using the apparatus described in Example III. The croutons were placed in the revolving drum and sprayed with 35 grams of water. One-third of the soup base was sifted onto the wetted, tumbling croutons. The croutons were sprayed with 22.5 grams of water and one-third of the soup base was sifted onto the croutons. The croutons were sprayed with another 22.5 grams of water and the remainder of the soup base was sifted onto the croutons. The enrobed croutons were dried in an oven at 50° C. for about 1 hour. The soup base coating satisfactorily adhered to the croutons. Soup was prepared by adding twenty-seven grams of the enrobed croutons to five ounces of hot water and stirring. The soup base quickly dissolved producing a delicious chicken soup with floating croutons.

EXAMPLE V

Instant french onion crouton soup was prepared according to the present invention. Approximately 950 grams of the aforedescribed croutons, upon removal from the toasting oven, were immedately placed in an enrober. Approximately 502 grams of a coating mixture were quickly sifted onto the hot tumbling croutons thereby coating the croutons. The coating mixture included 500 grams of the soup base shown in Table IV and 2 grams of caramel food coloring.

TABLE IV

| Ingredients: | Parts by weight |
| --- | --- |
| Salt, fine flour | 26.52 |
| Onion flavoring [1] | 22.54 |
| Hydrolyzed plant protein [2] | 15.01 |
| Hydrolyzed plant protein [3] | 8.55 |
| Beef tallow | 8.55 |
| Autolyzed yeast extract | 7.49 |
| Sugar, granulated | 5.34 |
| Monosodium glutamate | 5.34 |
| Caramel color | 0.34 |
| Pepper, black soluble | 0.32 |

[1] A flavoring agent produced by Fritzsche-D & O under the designation Dolcoseal 16218-R.
[2] A flavoring agent produced by Nestle Company, Inc. under the designation HVP 245.
[3] A flavoring agent produced by Nestle Company, Inc. under the designation 4BE.

The soup base was prepared in a manner like that of Example I. The coated croutons were cooled at room temperature for about 1 hour. About 874 grams of the coated croutons were then placed in the rotating enrober and 30 grams of sodium caseinate were added thereto. The tumbling croutons were sprayed with about 45 grams of water. A mixture was prepared including 75 grams toasted dehydrated onion pieces, 75 grams untoasted dehydrated onion pieces and 15 grams sodium caseinate. The onion pieces were of a size which passed through a #8 mesh screen and did not include onion powder. About one-half of the mixture was sprinkled onto the wetted, tumbling croutons. The croutons were sprayed with an additional 15 grams of water and the remainder of the onion pieces mixture was sprinkled onto the wetted, tumbling croutons. The croutons were sprayed with about 45 grams of water and tumbled for 4 minutes. The enrobed croutons were dried for 1 hour in an oven at 60° C. The final moisture content was 7%. Soup was prepared by adding enrobed croutons to 5 ounces of water. The rehydration required about 1 minute. The soup included free onion pieces and floating croutons.

The embodiments of the invention in which an exclusive property or privilege is claimed are defined as follows:

1. A method of preparing instant soup including the steps of applying a layer of oil to a crouton and then applying a layer of water soluble soup flavoring to the oil coated crouton thereby coating the croutons with soup flavoring and contacting the coated croutons with a hot water-based liquid thereby dissolving the flavoring.

2. The method of claim 1 wherein the soup has by weight 1 part soup base to between 5 and 50 parts water-based liquid.

3. The method of claim 1 including the further step of applying a bonding agent to said oil coated croutons, said bonding agent being a member selected from the group consisting of water and edible gums.

4. The method of claim 1 wherein said crouton is made from a mixture including flours, at least one of the flours being a high protein flour.

5. The method of claim 4 wherein the high protein flour is soy flour.

6. The method of claim 5 wherein the mixture further includes a citrus peel material.

7. The method of claim 5 wherein the mixture includes up to 65 parts soy flour and at least 35 parts wheat flour per 100 parts of total flour.

8. The method of claim 7 wherein the mixture further includes about ⅓ part of citrus peel.

9. The method of claim 4 wherein the mixture further includes a dry soup base.

10. The method of claim 4 wherein the crouton is prepared by mixing the flours with water, extruding the flour-water mixture to form an expanded rope, cutting the rope into pieces, and deep fat frying the pieces.

11. A method of preparing a flavored crouton including the steps of extruding and expanding a mixture including soy flour, a cereal flour and water thereby producing a crouton, formulating a water soluble soup base and applying a layer of the soup base to the crouton.

12. The method of claim 11 wherein the soup base is applied to the crouton by co-extrusion with said mixture.

13. A method of preparing a flavored crouton including applying a layer of edible bonding agent to a crouton, said bonding agent being a member selected from the group consisting of hydrogenated coconut oil, hydrogenated cottonseed oil, hydrogenated peanut oil, gum arabic, guar gum, gelatin and sodium caseinate and then contacting the crouton with a dry water soluble powdered soup base thereby providing the crouton with a soup base coating.

14. A method of preparing a flavored crouton including applying a layer of edible bonding agent to a crouton, said bonding agent being an edible oil that is applied to the crouton by spraying, then heating the crouton to maintain the oil in a melted condition as the crouton is contacted with a dry, water soluble powdered soup base, said crouton being contacted with the soup base by tumbling the crouton in a container including the soup base.

References Cited

UNITED STATES PATENTS

| 2,278,466 | 4/1942 | Musher | 99—124 X |
| 2,391,829 | 12/1945 | Huber | 99—124 |
| 2,532,131 | 11/1950 | Voorst. | |
| 3,336,139 | 8/1967 | Mech | 99—124 |
| 3,431,112 | 3/1969 | Durst | 99—124 X |
| 3,532,509 | 10/1970 | Gronberg | 99—83 |

FOREIGN PATENTS

| 2,774 | 3/1963 | Japan. |
| 3,186 | 8/1877 | Great Britain. |
| 858,060 | 5/1940 | France. |

FRANK W. LUTTER, Primary Examiner

R. HALPER, Assistant Examiner

U.S. Cl. X.R.

99—90 S